Figure 1:
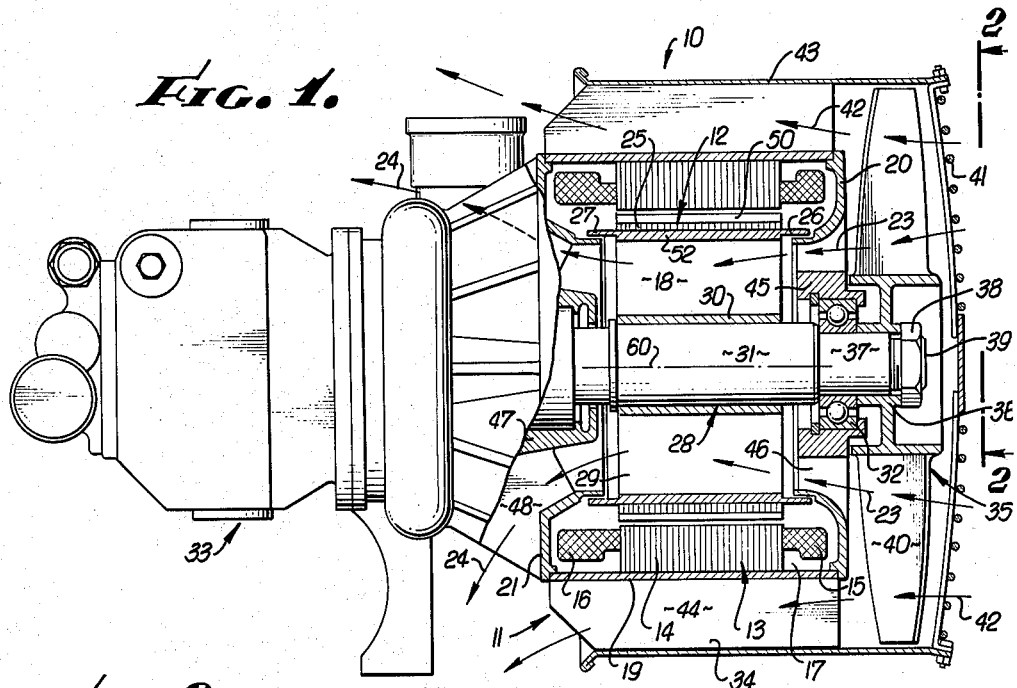

March 29, 1966     E. F. WARD     3,243,618

AIR COOLED ELECTRICAL MACHINE

Filed March 7, 1963

INVENTOR.
ELMER F. WARD
BY
*White & Haefliger*
ATTORNEYS.

United States Patent Office 3,243,618
Patented Mar. 29, 1966

3,243,618
AIR COOLED ELECTRICAL MACHINE
Elmer F. Ward, Santa Ana, Calif., assignor to Task Corporation, Anaheim, Calif., a corporation of California
Filed Mar. 7, 1963, Ser. No. 263,585
3 Claims. (Cl. 310—88)

This invention relates generally to the cooling of electrical machinery, and more particularly has to do with improvements in the construction of explosion proof machinery as respects cooling air passages in and around the rotor and stator assemblies, all for the purpose of promoting maximum cooling and efficiency of such machinery.

Speaking generally with respect to the design and operation of conventional explosion proof electrical equipment such as motors, normally a housing completely encloses rotor and stator parts to prevent dangerous escape of high temperature, or flame producing materials in the event of failure of the motor. Such construction creates a difficult cooling problem, particularly where the machinery has reduced size for a given output, since the area of the housing available for heat transfer to the exterior is limited. Also, heat generated by the rotor must be carried away by convection within the motor or must pass radially outwardly through the stator and/or the housing for removal.

The present invention contemplates a novel solution to these problems and enables a marked increase in cooling efficiency of both the rotor and stator, through providing for intimate cooling thereof by passing air through the rotor, as well as over the exterior of the stator, while at the same time providing for the necessary explosion proofing of the assembly. In its broader aspects, the invention is directed to an improved air cooled electrical machine comprising means including protective housing structure for rotor and stator assemblies, the rotor containing a passage extending endwise therethrough, together with means for displacing cooling air through said passage in cooling relation with the rotor interior.

More specifically, the housing structure extends in centrifugal explosion protecting relation to the rotor and stator assemblies, a portion of the housing structure acting with the rotor extent outwardly of the rotor air passage to form an annular hollow receiving the stator assembly, whereby in the event of motor failure the explosion producing materials will be confined within said hollow. Also, the housing structure includes a tubular shroud extending about a second air cooling passage at the stator peripheral exterior, in such manner that cooling air displaced by a fan travels in both inward and outward streams flowing respectively through the rotor passage and the mentioned second passage. The fan is, moreover, carried to rotate with the rotor so as to cause the cooling air to travel through the rotor passage inwardly of the rotor laminations, as will be brought out.

Figure 2:
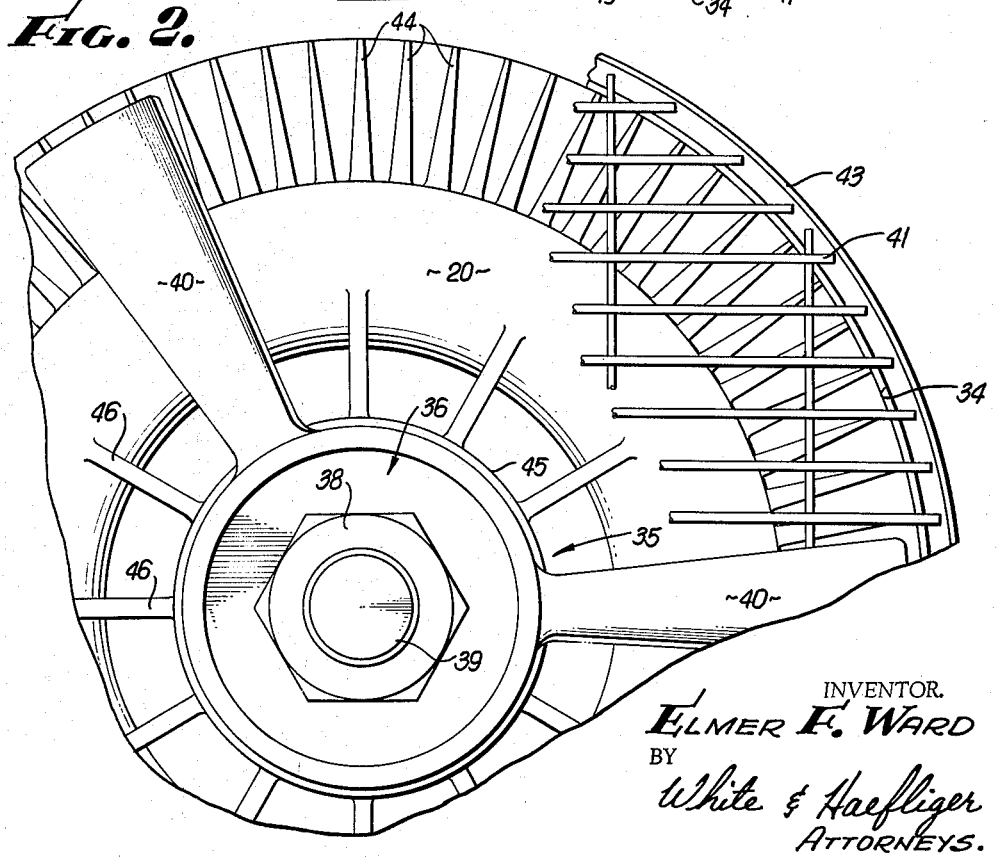

These and other objects and advantages of the invention, as well as the details of an illustrative embodiment, will be more fully understood from the following detailed description of the drawings, in which:

FIG. 1 is an elevation taken partly in vertical section through a motor embodiment of the invention; and FIG. 2 is a fragmentary enlarged end elevation taken on line 2—2 of FIG. 1.

The illustrated electrical machine 10 comprises means including protective housing structure 11 and rotor and stator assemblies 12 and 13. As shown, the stator includes an elongated laminar core 14 containing openings, not shown, extending through the stator winding in an axial direction, the end windings at opposite ends of the core being shown as rings 15 and 16. These elements of the stator are contained within an annular hollow 17 formed by the rotor structure outwardly of a cooling passage 18 through the rotor assembly, and by a portion of the housing structure 11. The latter includes a cylindrical sleeve 19 extending directly about the stator laminations in heat transfer contact therewith, and about the end windings 15 and 16. Said portion of the housing structure also includes what may be referred to as end bells 20 and 21, tapering inwardly and endwise oppositely toward opposite ends of the rotor, outwardly of the rotor passage 18, for guiding cooling air in relation to the rotor passage as indicated by the entrance and exit arrows 23 and 24.

The rotor assembly 12 includes annular laminations 25 extending in planes perpendicular to the axis 60, and a series of circularly spaced conductor bars 50 received or sunk in the laminar core, forming the squirrel cage associated with induction motors, there being annular conductive end rings 26 and 27 at opposite ends of the laminations and in electrical contact with the ends of the conductor bars through end laminations. As is clear from FIG. 1, the end bells 20 and 21 taper inwardly and oppositely into close overlapping proximity to the end rings 26 and 27, thereby to provide an explosion proof labyrinth seal at each end of the rotor. Further, the end rings 26 and 27 are integral with explosion protective rotor sleeve 52 mounting the rotor laminations.

The embodiment of the unit shown also includes a shaft 28 extending axially endwise through the rotor and in supporting relation therewith, as facilitated by the cooling vanes 29 extending outwardly to the sleeve 52 from a vane support sleeve 30 on the shaft enlargement 31. Thus, the cooling passage 18 through the rotor is outward of the shaft, but inward of the laminations 25.

The shaft 28 typically has bearing support at 32 and also within the structure generally indicated at 33, which may typically comprise a pump or other driven device. Also, the unit includes means such as fan 35 for displacing air through the passage 29 and through annular passage 34 outward of the stator, in efficient cooling relation with both the rotor interior and stator exterior. The fan is made rotatable with the rotor 12, as may be accomplished by mounting the fan at 36 on the shaft extension 37 of reduced diameter. To this end, a nut 38 may be threaded on the shaft end 39 to retain the fan hub 36 on the shaft. Finally the fan has blades 40 projecting outwardly typically at one end of the rotor assembly, so as to draw air through the screen 41 and displace it in inward and outward streams, indicated by the arrows 23 and 42.

The outer passage 34 through which the streams 42 pass is typically formed by a housing shroud 43, which is tubular and outwardly spaced from the panel 19, suitable cooling vanes 44 extending therebetween. The vanes also serve to support the shroud.

It will be noted that the bearing 32 may be of self-lubricating type, and contained within a housing ring 45 from which vanes 46 extend to the end bell 20. At the opposite end of the rotor, a housing ring 47 is connected with the end bell 21 as by vanes 48. Accordingly, heat transferred to the end bells 20 and 21 from the rotor and stator flows to the vanes 46 and 48 for efficient dissipation into the cooling air streams 23 and 24.

I claim:

1. In an air cooled electrical machine, coaxial rotor and stator assemblies each having laminations, explosion protective housing structure extending about stator and rotor laminations, said structure including a non-rotary tubular portion adjacent stator laminations in heat receiving relation therewith, the rotor assembly containing a cooling air passage extending openly and axially therethrough, a shroud spaced outwardly of said explosion protective housing structure to form therewith another cooling air passage extending openly and axially therebetween, and means for displacing cooling air axially through said passages in separate streams.

2. The combination of claim 1 in which said protective housing structure forms an inlet tapering toward said rotor passage to conduct cooling air toward the passage interior, said air displacing means comprising a fan located to displace cooling air toward both said passages, and said machine includes a shaft mounting said rotor assembly and said fan for rotation.

3. The combination of claim 1 in which said structure includes annularly overlapping rotary and non-rotary elements forming explosion proof labyrinth seals at opposite ends of said rotor assembly.

References Cited by the Examiner
UNITED STATES PATENTS

| | | | |
|---|---|---|---|
| 1,858,261 | 5/1932 | Barnholdt | 310—57 |
| 1,919,557 | 7/1933 | Johnson | 310—57 |

MILTON O. HIRSHFIELD, *Primary Examiner.*

ORIS L. RADER, *Examiner.*

L. L. SMITH, *Assistant Examiner.*